United States Patent [19]

Smith, II

[11] Patent Number: 4,620,254

[45] Date of Patent: Oct. 28, 1986

[54] INFORMATION STORAGE AND RETRIEVAL SYSTEM INCLUDING A TAPE CARTRIDGE HAVING A SLIDABLE COVER

[75] Inventor: Kobert R. Smith, II, Los Altos Hills, Calif.

[73] Assignee: BSR North America, Ltd., New York, N.Y.

[21] Appl. No.: 455,473

[22] Filed: Jan. 4, 1983

[51] Int. Cl.⁴ .................. G11B 23/02; G11B 23/04
[52] U.S. Cl. ................................... 360/132; 360/93
[58] Field of Search ............... 360/132, 133, 93, 96.5; 220/337; 206/387, 444; 242/197, 199, 198

[56] References Cited

U.S. PATENT DOCUMENTS

| Re. 29,976 | 4/1979 | Schoettle et al. | 360/132 |
|---|---|---|---|
| 1,904,097 | 4/1933 | Steiner . | |
| 2,867,389 | 1/1959 | Viets | 242/55.11 |
| 3,524,567 | 8/1970 | Coleman | 220/41 |
| 3,672,603 | 6/1972 | Swain | 242/194 |
| 3,815,971 | 6/1974 | Land | 352/130 |
| 3,900,170 | 8/1975 | Serizawa | 242/198 |
| 3,932,891 | 1/1976 | Horvath | 360/93 |
| 3,980,255 | 9/1976 | Serizawa | 242/198 |
| 4,021,006 | 5/1977 | Morimoto et al. | 242/199 |
| 4,045,821 | 8/1977 | Fujikura | 360/132 |
| 4,093,149 | 6/1978 | Shroff et al. | 242/198 |
| 4,149,027 | 4/1979 | Asher et al. | 174/52 R |
| 4,235,395 | 11/1980 | Wardenaar | 242/199 |
| 4,363,456 | 12/1982 | Goto | 242/197 |
| 4,399,480 | 8/1983 | Edwards | 360/132 |
| 4,445,157 | 4/1984 | Takahashi | 360/133 |

FOREIGN PATENT DOCUMENTS 2058261 8/1971 Fed. Rep. of Germany ...... 242/199

*Primary Examiner*—Stuart N. Hecker
*Assistant Examiner*—Benjamin Urcia
*Attorney, Agent, or Firm*—Fitch, Even, Tabin & Flannery

[57] ABSTRACT

An information storage and retrieval system including an information containing cartridge, specifically a tape cartridge, and an apparatus for retrieving information therefrom is disclosed herein. The cartridge contains its information on magnetic tape within the housing and the latter has an opening for gaining access to the magnetic tape by the retrieval apparatus. At the same time, the cartridge housing carries a cover movable between a first position for covering the opening in order to protect its interior, especially the magnetic tape, from dust and other elements in the ambient surroundings and a second position for uncovering the opening in order to gain access to the tape.

4 Claims, 5 Drawing Figures

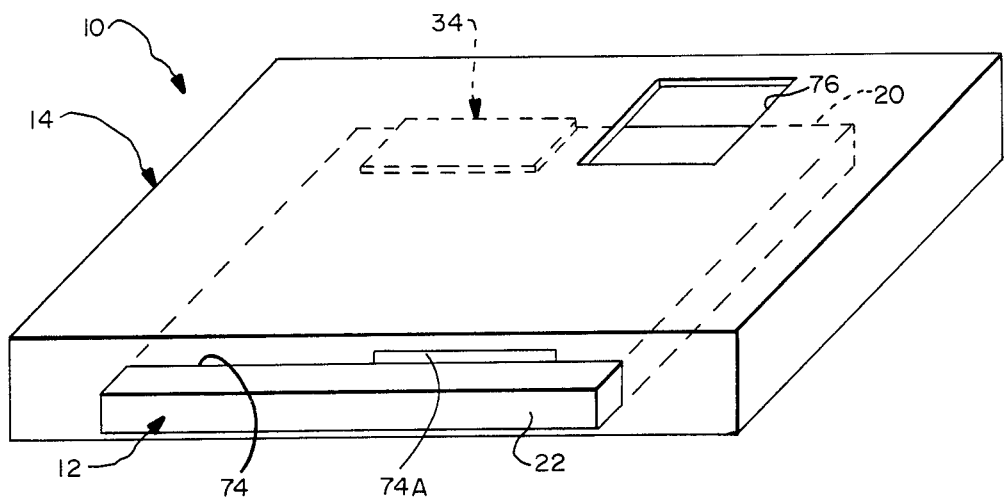
FIG. — 1
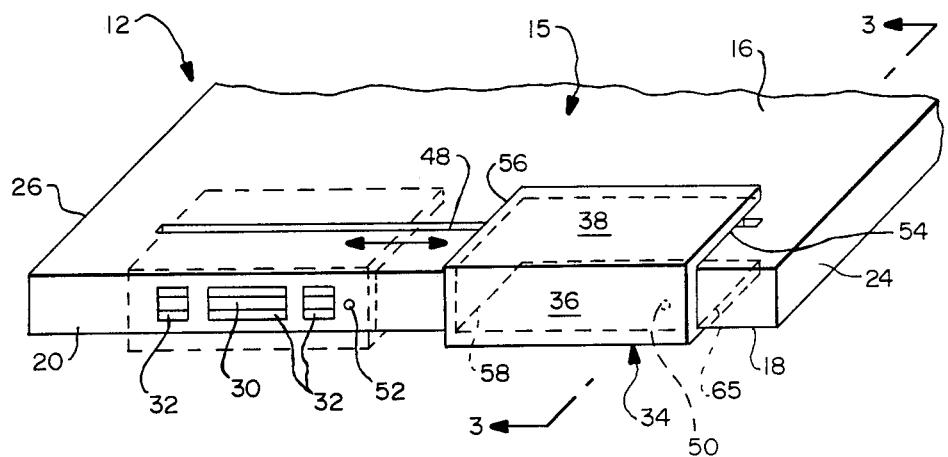
FIG. — 2
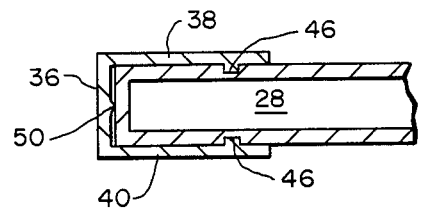
FIG. — 3

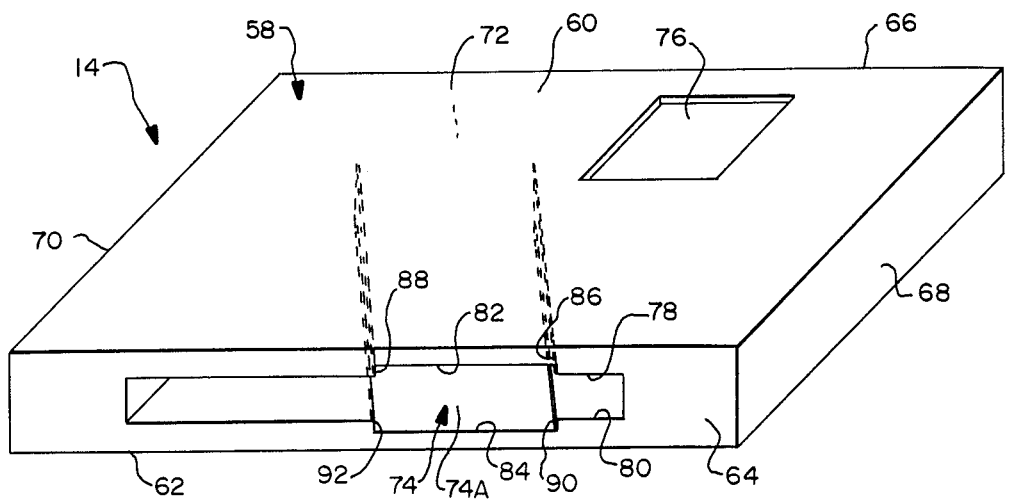
FIG. — 4
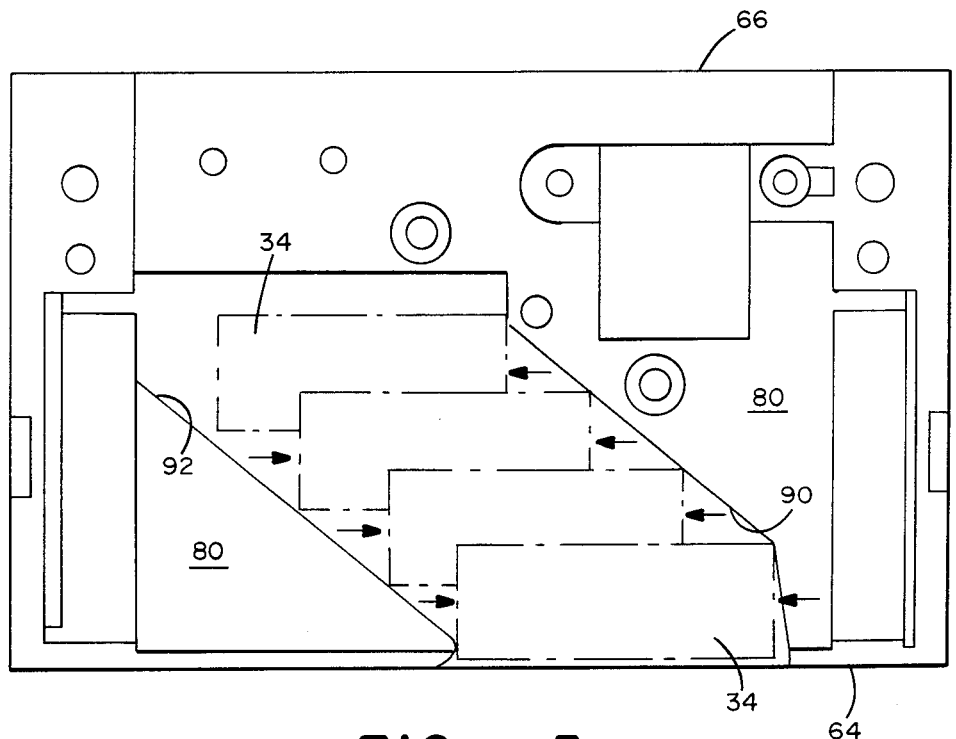
FIG. — 5

INFORMATION STORAGE AND RETRIEVAL SYSTEM INCLUDING A TAPE CARTRIDGE HAVING A SLIDABLE COVER

The present invention relates generally to information storage and retrieval systems of the general type which utilize information containing cartridges and more particularly to a technique for protecting the information storage mechanism within a magnetic tape type cartridge when the cartridge is not in use.

There are presently many different types of storage and information retrieval systems which utilize information containing cartridges (or cassettes). For example, dictating equipment using magnetic tape in cartridges fall within that category as does video cassette recording equipment. More recently, there has been a desire to place digital information on magnetic tape which is stored within a cartridge or cassette. For purposes herein, the term "cartridge" is used to encompass both cartridges and cassettes.

The typical cartridge of the general type to which the present invention is directed utilizes specific means including magnetic tape for storing retrievable information and a cartridge housing. The latter has an inner compartment which contains the tape and also an opening into the compartment for gaining access to the tape by cooperating information retrieving apparatus, for example, the previously mentioned dictating machine, a video cassette recorder or the like. While information containing cartridges which are presently available are quite convenient and generally satisfactory in use, applicant has found one particular failing in their design. Specifically, in each of the cartridges presently available, the housing contains an opening for gaining access to its information bearing by the cooperating information retrieving apparatus. However, this opening is present in most constructions whether or not the cartridge is in use. As a result the magnetic tape stored within the cartridge housing and its support components are always exposed to the dust and other elements in the ambient surroundings.

As will be discussed in more detail hereinafter, the cartridge disclosed herein is one which utilizes means including magnetic or like tape for storing certain information in a particular mode, for example magnetically, and a cartridge housing. The housing has an inner compartment including the information storing means and an opening therein for gaining access to the storing means by cooperating information retrieving apparatus. In accordance with the present invention, the cartridge also includes cover means connected with the housing for camming movement between a first position covering the opening and a second position uncovering the opening and thereby allowing the cooperating information retrieving apparatus to gain access to the tape. In a preferred embodiment of the present invention, the cartridge disclosed herein and its information retrieving apparatus include cooperating camming means for automatically uncovering the opening in the cartridge when the latter is combined with the apparatus and for automatically closing the opening when the cartridge is separated from the apparatus.

The overall information storage and retrieval system disclosed herein will be described in more detail hereinafter in conjunction with the drawings wherein:

FIG. 1 is a perspective view of the overall information storage and retrieval system designed in accordance with the present invention;

FIG. 2 is a perspective view of a magnetic tape cartridge forming part of the system illustrated in FIG. 1;

FIG. 3 is a sectional view of the cartridge illustrated in FIG. 2, taken generally along line 3—3 in FIG. 2;

FIG. 4 is a perspective view of an information retrieving apparatus forming part of the overall system illustrated in FIG. 1 apart from the cartridge illustrated in FIG. 2; and FIG. 5 diagrammatically illustrates how the cartridge of FIG. 2 is combined with and separated from the apparatus of FIG. 4 in accordance with the present invention.

Turning now to the drawings, where like components are designated by like reference numerals throughout the various figures, attention is first directed to FIG. 1 which illustrates an overall information storage and retrieval system generally designated by the reference numeral 10. System 10 includes a magnetic tape type of cartridge generally indicated at 12 for storing information and an apparatus or "player" 14 for retrieving the information stored by cartridge 12. A player may be, for example, a dictating machine, a video cassette recorder, part of a computer or the like. As will be discussed in more detail below, cartridge 12 is a separate entity from the player. By placing the cartridge in its loaded position within player 14, the information stored thereby is automatically made available to the player. On the other hand, when the cartridge is removed from the player, its internal information and specifically the magnetic tape containing that information and cooperating components are automatically protected from the ambient surroundings in accordance with the present invention.

Referring specifically to FIGS. 2 and 3, cartridge 12 is illustrated apart from player 14. This cartridge includes an outermost, generally rectangular housing 15 having a horizontally extending top side 16 and opposite bottom side 18 which are joined together by opposing vertical front and back walls 20, 22 and opposing vertical side walls 24, 26. The housing defines an inner compartment 28 (see FIG. 3) which contains an information storage mechanism including magnetic tape 30 and cooperating components (not shown). These cooperating components include, for example, a drive arrangement for operatively connecting the tape with player 14 in order to retrieve the information stored thereon when the cartridge is loaded into the player as illustrated in FIG. 1.

In order for player 14 to gain access to information stored on tape 30, cartridge housing 15 includes a series of adjacent openings 32 which extend along a section of front wall 20. In accordance with the present invention, cartridge 12 includes means for covering openings 32 when the cassette is not in use and for uncovering these openings when it is in use, specifically when it is in its loaded position within player 14. In the particular embodiment illustrated, a generally U-shaped cover 34 serves as the covering means. This cover includes a front segment 36 and rearwardly extending top and bottom back segments 38 and 40 respectively disposed in confronting relationship with a section of front wall 20 and top and bottom sides 16 and 18 of housing 15. The cover is interconnected with the housing by cooperating ribs and grooves 46, 48 for sliding movement along the cartridge body between the solid and dotted line positions illustrated in FIG. 2.

With cover 34 in its solid line position, it is located to one side of openings 32 in order to uncover these openings and thereby allow player 14 to gain access to tape 30 and its cooperating components. When the cover is slid to its dotted line position, it completely covers openings 32 in order to protect tape 30 and its cooperating components. As illustrated in FIGS. 2 and 3, the inner surface of front segment 36 forming part of cover 34 includes a rearwardly directed, relatively small projection or dimple 50. At the same time, front side 20 of housing 15 includes a cooperating recess 52. The recess is positioned to receive the dimple when cover 34 is in its dotted line position over openings 32. The cover is designed to have a degree of flexibility so that the dimple snaps into the recess when the cover is in its dotted line position over openings 32, thereby holding the cover in this position and preventing it from being inadvertently moved back towards its solid line position with minimal force.

As stated above, cover 34 includes front segment 36 and top and bottom back segments 38 and 40. As illustrated in FIGS. 2 and 3 (and also FIG. 5) top segment 38 includes opposite vertically extending end shoulders 54 and 56 (FIG. 2) and bottom segment 40 includes opposite vertically extending end segments 58 and 65 (also see FIG. 5). As will be seen hereinafter, these shoulders cooperate with certain components forming part of player 14 so that cover 34 is automatically moved by camming action from its dotted line position to its solid line position for exposing openings 32 as the cartridge is loaded into player 14 and is automatically moved back by camming action to its dotted line position for covering the opening as the cartridge is removed from the player.

Referring to FIGS. 4 and 5 in conjunction with FIG. 1, attention is now directed to player 14 which is shown including a main housing 58 having horizontally extending top and bottom sides 60 and 62 joined by vertically extending front and back walls 64, 66 and side walls 68, 70. The housing includes an inner chamber 72 and a generally rectangular opening 74 into the chamber from its front wall 64. For reasons to become apparent below, opening 74 includes an enlarged central section 74A. In addition to housing 58 having this opening and a window 76 in top side 60, player 14 includes the necessary and readily providable components for retrieving information stored on tape 30 of cartridge 12 when the latter is loaded into chamber 72 in the intended manner. These additional components include, for example, a magnetic head and a capstan (not shown).

With reference to FIGS. 4 and 5 specifically, player 14 is shown including a pair of horizontal, confronting top and bottom surfaces 78 and 80 located within chamber 72 and extending rearwardly from opening 74. These confronting surfaces include vertically aligned recesses 82 and 84 which extend rearwardly from opening 74 (accounting for enlarged portion 74A) at an angle to the left as viewed in FIGS. 4 and 5. Recess 82 defines vertical shoulders 86 and 88 extending in a similar direction and recess 84 defines vertical shoulders 90 and 92 respectively vertically aligned with shoulders 86 and 88. Referring specifically to FIG. 5, as cartridge 12 is inserted into player 44 through opening 74 with cover 34 initially in its dotted line position (see FIG. 2), the forwardmost edges of cover shoulders 56 and 58 engage player shoulders 86 and 90 respectively. As a result, as the cartridge is moved further into the player and ultimately into its loaded position, cover 34 is forced by camming action to the left (as viewed in FIG. 5) and ultimately to its solid line position (FIG. 2) in order to expose openings 32. On the other hand, when the cartridge is removed, the rearward edges of cover shoulders 54 and 60 engage player shoulders 88 and 92 for automatically camming the cover to its dotted line position covering openings 32.

What is claimed is:

1. A system for storing and retrieving certain information comprising an information retrieving apparatus and a cartridge assembly wherein
   said cartridge assembly includes:
   (i) means including magnetic tape for storing said information on said tape;
   (ii) a cartridge housing having an interior including said information storing means, said housing also having an opening for gaining access to said storing means by said information retrieving apparatus; and
   (iii) cover means connected with said housing for movement between a first position closing said opening and a second position uncovering said opening and thereby allowing said apparatus to gain access to said storing means; and wherein
   said information retrieving apparatus includes an apparatus support structure having a receiving chamber configured to receive said cartridge assembly for connecting said information retrieving apparatus with said storing means through the opening in said cartridge housing;
   said system further comprising camming means forming part of said cartridge assembly and part of said information retrieving apparatus for automatically camming said cover means from its first position to its second position as said assembly is placed into said receiving chamber for connection to said information retrieving apparatus and for automatically camming said cover means from its second position to its first position as said assembly is removed from said chamber when said information storing means is disconnected from said information retrieving apparatus, wherein said camming means comprises a track within said receiving chamber and end shoulders on said cover means which are engaged by said track to cam said cover means between its first and second positions as said assembly is inserted into and withdrawn from said receiving chamber.

2. The system of claim 1 wherein said cover means and said cartridge housing further comprise detent means and corresponding recess means, one of said detent means and corresponding recess means being located on said cover means and the other of detent means and corresponding recess means being located on said cartridge, said detent means and corresponding recess means being positioned relative to each other so as to secure said cover means in said first position when said cartridge assembly has been removed from said receiving chamber.

3. An information retrieving apparatus cooperable with an information containing cartridge assembly including means for storing information on magnetic tape, to retrieve information stored by the latter, said cartridge assembly having a housing provided with an opening for gaining access into its interior to said information storing means located therein and a cover moveable between a first position closing said opening by blocking the same and a second position unblocking said opening to allow said information retrieving apparatus to gain access to said storing means, comprising an apparatus support structure having a receiving chamber configured to receive said cartridge assembly, which chamber is provided with camming means interactable with corresponding structure associated with said cartridge assembly for automatically moving the cover of said cartridge assembly from said first position to said second position when said cartridge assembly is inserted into said receiving chamber, wherein said camming means comprises a track within said receiving chamber engageable with end shoulders on said cover means to cam said cover means from its first position to its second position when said cartridge assembly is inserted into said receiving chamber and from its second position to its first position when said cartridge assembly is removed from said receiving chamber.

4. An information storage and retrieval system comprising:

magnetic tape for storing information;

an information retrieval apparatus including a track and means for retrieving said information from said magnetic tape;

A cartridge housing having an interior including said magnetic tape, said housing also having an opening for gaining access to said magnetic tape by said information retrieving apparatus; and cover means connected with said cartridge housing for movement between a first position closing said opening and a second position uncovering said opening and thereby allowing said information retrieving apparatus to gain access to said magnetic tape, said cover means including camming means comprising a plurality of vertically extending shoulders, each positioned at a predetermined location on said cover means such that said camming means comes in contact with said track when said cartridge housing is inserted into said information retrieving apparatus said track and said camming means being configured such that insertion of said cartridge housing into said information retrieving apparatus causes said cover means to be moved from said first position at one end of said track to said second position at the other end of said track.

* * * * *